United States Patent
Khina et al.

(10) Patent No.: US 11,446,746 B2
(45) Date of Patent: Sep. 20, 2022

(54) REPLACEABLE CUTTING HEAD HAVING BACK-TAPERED CONICAL EXTERNAL THREAD AND ROTARY CUTTING TOOL

(71) Applicant: Iscar, Ltd., Tefen (IL)

(72) Inventors: Alexander Khina, Kfar Vradim (IL); Shmuel Vainshtain, Carmiel (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 16/708,565

(22) Filed: Dec. 10, 2019

(65) Prior Publication Data
US 2021/0170498 A1    Jun. 10, 2021

(51) Int. Cl.
*B23B 31/11* (2006.01)

(52) U.S. Cl.
CPC ....... *B23B 31/1115* (2013.01); *B23B 2251/02* (2013.01); *Y10T 279/16* (2015.01)

(58) Field of Classification Search
CPC . B23B 31/11; B23B 31/1115; B23B 31/1122; B23B 31/006; B23B 31/1107; B23B 2231/0204; B23B 2260/138; B23B 2260/1381; B23B 2260/1383; B23B 2260/1386; B23B 2260/1388; B23B 2251/02; B23C 2210/02; B23C 2210/03; Y10T 279/16; Y10T 279/17931; Y10T 408/90993; F16B 33/02; F16B 39/30
USPC ........................................ 411/366.1, 308, 423
See application file for complete search history.

(56) References Cited

U.S. PATENT DOCUMENTS

| | | | |
|---|---|---|---|
| 6,485,220 B2 | 11/2002 | Hecht | |
| 7,374,376 B2 | 5/2008 | Jonsson et al. | |
| 7,611,311 B2 | 11/2009 | Kakai et al. | |
| 7,713,004 B2 | 5/2010 | Lehto et al. | |
| 8,038,377 B2 * | 10/2011 | Ichiryu | F01D 5/066 411/366.1 |
| 8,226,333 B2 | 7/2012 | Kakai et al. | |
| 8,931,983 B2 | 1/2015 | Sharivker et al. | |
| 8,939,685 B2 | 1/2015 | Cigni | |
| 9,068,558 B2 * | 6/2015 | Laursen | F16B 33/02 |
| 9,643,262 B2 | 5/2017 | Frota De Souza et al. | |
| 9,643,264 B2 | 5/2017 | Frota De Souza et al. | |

(Continued)

FOREIGN PATENT DOCUMENTS

| | | |
|---|---|---|
| CN | 109434143 A | 3/2019 |
| DE | 8900085 U1 | 4/1989 |

(Continued)

OTHER PUBLICATIONS

Machine Translation, description of JP2001-009626A. (Year: 2001).*

(Continued)

*Primary Examiner* — Chwen-Wei Su
(74) *Attorney, Agent, or Firm* — Womble Bond Dickinson (US) LLP

(57) ABSTRACT

A rotary cutting tool includes a replaceable cutting head and a tool holder. The replaceable cutting head includes a forward cutting portion and a rearward mounting portion. The mounting portion includes a male coupling member that includes a back-tapered conical external thread. The tool holder includes a female coupling member that includes an internal thread. When the rotary cutting tool is in a locked position, the external thread is threadingly engaged with the internal thread.

14 Claims, 4 Drawing Sheets

(56) References Cited

U.S. PATENT DOCUMENTS

| | | |
|---|---|---|
| 10,092,964 B2 * | 10/2018 | Chang ................. B23B 31/1115 |
| 10,105,771 B2 | 10/2018 | Guy |
| 2006/0257215 A1 | 11/2006 | Kakai |
| 2009/0010709 A1 | 1/2009 | Berglow et al. |
| 2012/0009027 A1 | 1/2012 | Sharivker et al. |
| 2015/0016905 A1 | 1/2015 | Haimer |
| 2015/0030399 A1 | 1/2015 | Frota De Souza et al. |
| 2015/0063928 A1 | 3/2015 | Maeda et al. |
| 2017/0266738 A1 | 9/2017 | Guy |
| 2017/0291230 A1 | 10/2017 | Harpaz et al. |

FOREIGN PATENT DOCUMENTS

| | | | |
|---|---|---|---|
| JP | 2001-009626 A | 1/2001 | |
| SU | 663906 A1 | 5/1979 | |

OTHER PUBLICATIONS

Online Catalog: Coromill 316 The Exchangeable Head Milling System (Sandvik), retrieved Dec. 9, 2019 at https://www.sandvik.coromant.com/en-us/products/coromill_316/pages/product-details.aspx.

International Search Report dated Mar. 4, 2021, issued in PCT counterpart application (No. PCT/IL2020/051168).

Written Opinion dated Mar. 4, 2021, issued in PCT counterpart application (No. PCT/IL2020/051168).

\* cited by examiner

REPLACEABLE CUTTING HEAD HAVING BACK-TAPERED CONICAL EXTERNAL THREAD AND ROTARY CUTTING TOOL

FIELD OF THE INVENTION

The subject matter of the present application relates to rotary cutting tools of the type in which a replaceable cutting head, having a male coupling member, is removably retained in a female coupling member, of a tool holder, by means of a threaded coupling mechanism.

BACKGROUND OF THE INVENTION

Rotary cutting tools can be provided with a threaded coupling mechanism, or "tool joint", for securely retaining a replaceable cutting head within a tool holder.

The replaceable cutting head can include a male coupling member and the tool holder can include a female coupling member. The male coupling member can include an external thread. The female coupling member can include an internal thread that corresponds to the external thread on the male coupling member.

In some such rotary cutting tools, the internal and external threads are both straight threads. An example of such a rotary cutting tool is disclosed in, for example, U.S. Pat. No. 6,485,220.

In other such rotary cutting tools, the internal and external threads are both forward-tapered conical threads. Examples of such a rotary cutting tool are disclosed in, for example, U.S. Pat. Nos. 7,611,311, 7,713,004, 9,643,262 and 9,643,264.

In yet other such rotary cutting tools, the external threads are forward-tapered conical threads, and the external threads are straight threads. An example of such a rotary cutting tool is disclosed in U.S. Pat. No. 10,105,771.

SUMMARY OF THE INVENTION

In accordance with a first aspect of the subject matter of the present application there is provided a replaceable cutting head, having a head longitudinal axis extending in a forward to rearward direction, comprising
 a forward portion forming a cutting portion; and
 a rearward portion forming a mounting portion, the mounting portion comprising a male coupling member having an external thread and protruding rearwardly from a head base surface, the head base surface extending transversely with respect to the head longitudinal axis, and defining a boundary between the cutting portion and the mounting portion, wherein:
  the external thread comprises an external thread ridge extending helically about an external thread axis and comprising forward and rearward external flank surfaces and an external top surface extending therebetween;
  the forward and rearward external flank surfaces generally face in opposite axial directions and delimit a helical external thread groove that comprises an external bottom surface; and
  the external thread of the male coupling member is a back-tapered conical thread having at least one thread diameter which increases in the rearward direction.

In accordance with a second aspect of the subject matter of the present application there is provided a rotary cutting tool having a longitudinal axis and extending in a forward to rearward direction, comprising:
 a tool holder having a holder longitudinal axis and a replaceable cutting head of the type described above threadingly engaged to the tool holder.

It is understood that the above-said is a summary, and that features described hereinafter may be applicable in any combination to the subject matter of the present application, for example, any of the following features may be applicable to the replaceable cutting head or the rotary cutting tool:

At least one of the external thread ridge and the external thread groove can extend about a respective cone having a cone angle.

Both the external thread ridge and the external thread groove can extend about a respective cone, an outer cone and an inner cone, respectively.

The cone angle can be the same for the inner cone and the outer cone.

The cone angle can be in greater or equal to 0.02° and less than or equal to 1.0°.

The cone angle can be equal to exactly 0.4°.

In a cross-sectional view taken in an axial plane containing the external thread axis, the external top surface form a plurality of external thread crests that can be sloped with respect to the external thread axis and co-linear with each other. The external bottom surface form a plurality of external thread roots that can be sloped with respect to the external thread axis and co-linear with each other.

In a cross-sectional view taken in an axial plane containing the head longitudinal axis, the external thread defines an external thread form that can be trapezoidal.

The external thread can have a constant external thread pitch.

The tool holder can have a female coupling member having an internal thread extending rearwardly from a holder forward surface, the holder forward surface extending transversely with respect to the holder longitudinal axis. The rotary cutting tool can be adjustable between: a) a released position in which the internal and external threads may not be threadingly engaged to one another, and b) a locked position in which the male coupling member may be removably retained in the female coupling member with the internal and external threads threadingly engaged to one another.

The internal thread of the female coupling member can be a straight thread.

The frictional engagement between the external thread and the internal thread can increase in a direction from a forwardmost turn of the external thread towards the rearmost turn of the external thread.

The internal thread can comprise an internal thread ridge, extending helically about an internal thread axis, and comprising forward and rearward internal flank surfaces and an internal top surface extending therebetween. The forward and rearward internal flank surfaces can generally face in opposite axial directions and delimit a helical internal thread groove that comprises an internal bottom surface. The forward external flank surface and the forward internal flank surface can face in the forward direction. The rearward external flank surface and the rearward internal flank surface can face in the rearward direction. In the locked position, the rearward internal flank surface can abut the forward external flank surface.

In the locked position: the forward internal flank surface can be spaced apart from the rearward external flank surface by a rearward flank distance. The internal top surface can be spaced apart from the external bottom surface by an upper distance. The internal bottom surface can be spaced apart from the external top surface by a lower distance.

The rearward flank, upper and lower distances can all decrease in the rearward direction.

The internal thread can have a constant internal thread pitch which is the same as the external thread pitch.

BRIEF DESCRIPTION OF THE FIGURES

For a better understanding of the present application and to show how the same may be carried out in practice, reference will now be made to the accompanying drawings, in which.

Figure 1:
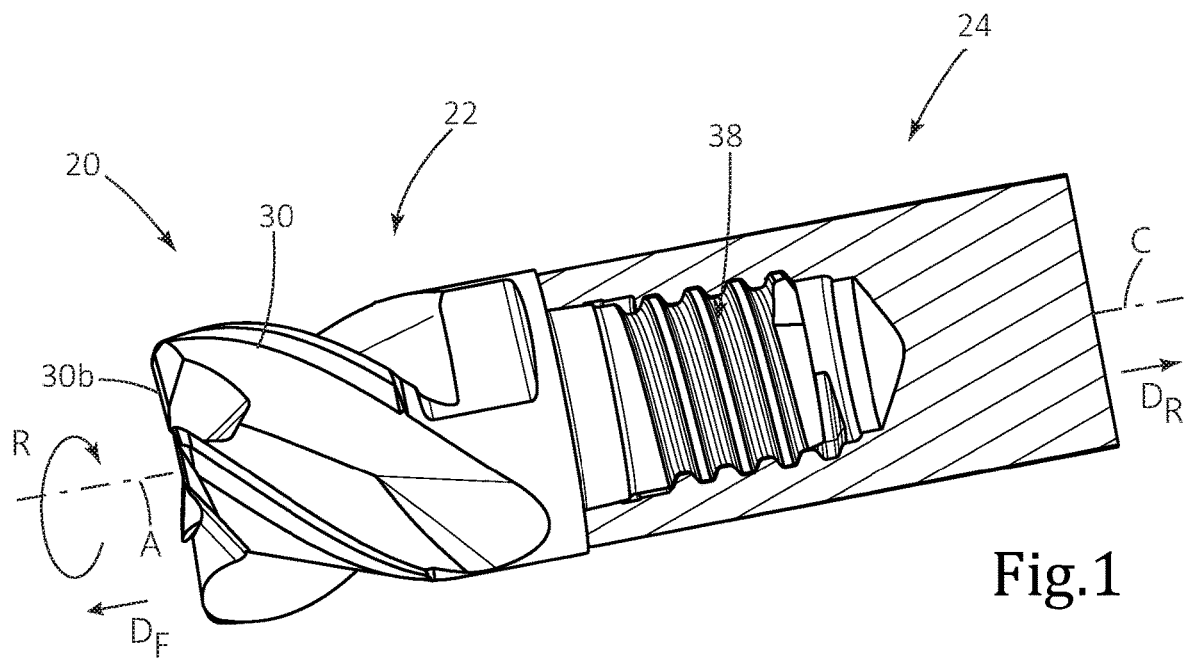
FIG. 1 is a perspective longitudinal cross-sectional view of a rotary cutting tool.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
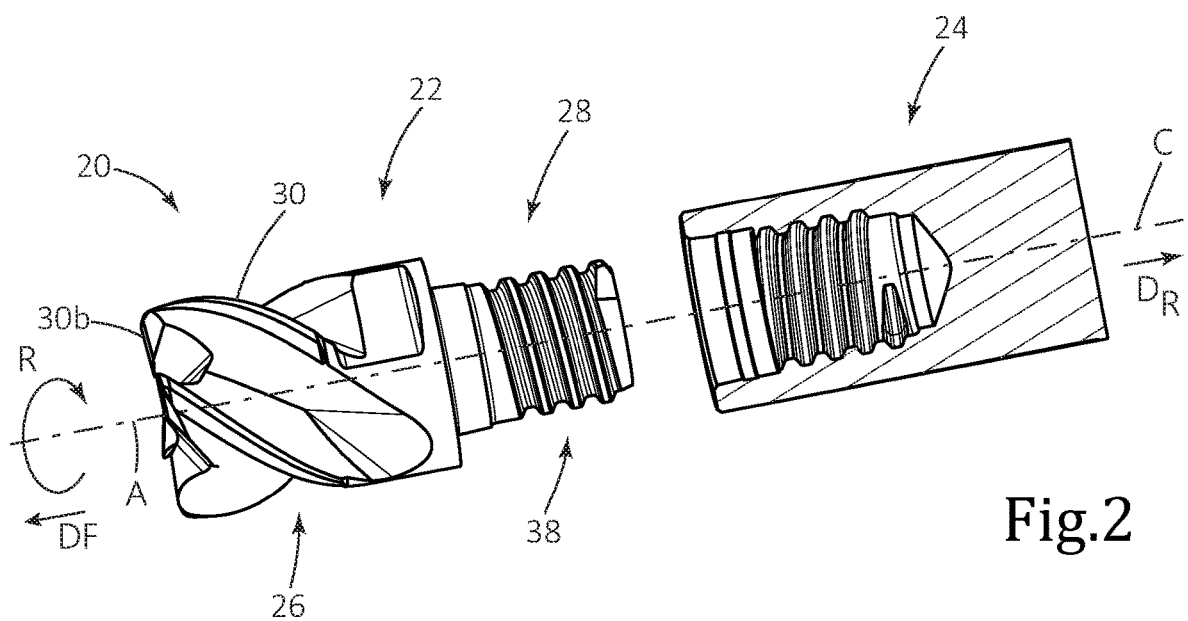
FIG. 2 is an exploded perspective longitudinal cross-sectional view of the rotary cutting tool shown in FIG. 1.

Attention is first drawn to FIGS. 1 and 2 showing a rotary cutting tool 20 of the type used for milling operations, specifically end milling, in accordance with embodiments of the subject matter of the present application. The rotary cutting tool 20 has a tool longitudinal axis L around which the tool rotates in a direction of rotation R.

The rotary cutting tool 20 includes a replaceable cutting head 22 that has a head longitudinal axis A, around which the replaceable cutting head 22 rotates in the direction of rotation R. The head longitudinal axis A extends in the forward $D_F$ to rearward direction $D_R$. The replaceable cutting head 22 can be typically made from cemented carbide.

The rotary cutting tool 20 also includes a tool holder 24 having a holder longitudinal axis C. The tool holder 24 can be typically made from steel. The replaceable cutting head 22 can be removably retained in the tool holder 24 by means of a threaded coupling mechanism. Such a threaded coupling mechanism could possibly be advantageous for other types of rotary cutting operations than that stated hereinabove, such as, for example, reaming or drilling.

It should be appreciated that use of the terms "forward" and "rearward" throughout the description and claims refer to a relative position of the replaceable cutting head 22 to the tool holder 24 of the assembled rotary cutting tool 20, as seen in FIG. 1. The terms "forward" and "rearward" may also be applied in a direction of the head longitudinal axis A towards the left and right, respectively, in FIGS. 3 and 4, and also in a direction of holder longitudinal axis C towards the left and right, respectively, in FIGS. 5 and 6. It is understood that the tool holder 24 also extends along its own forward to rearward direction along the holder longitudinal axis C.

Figure 3:
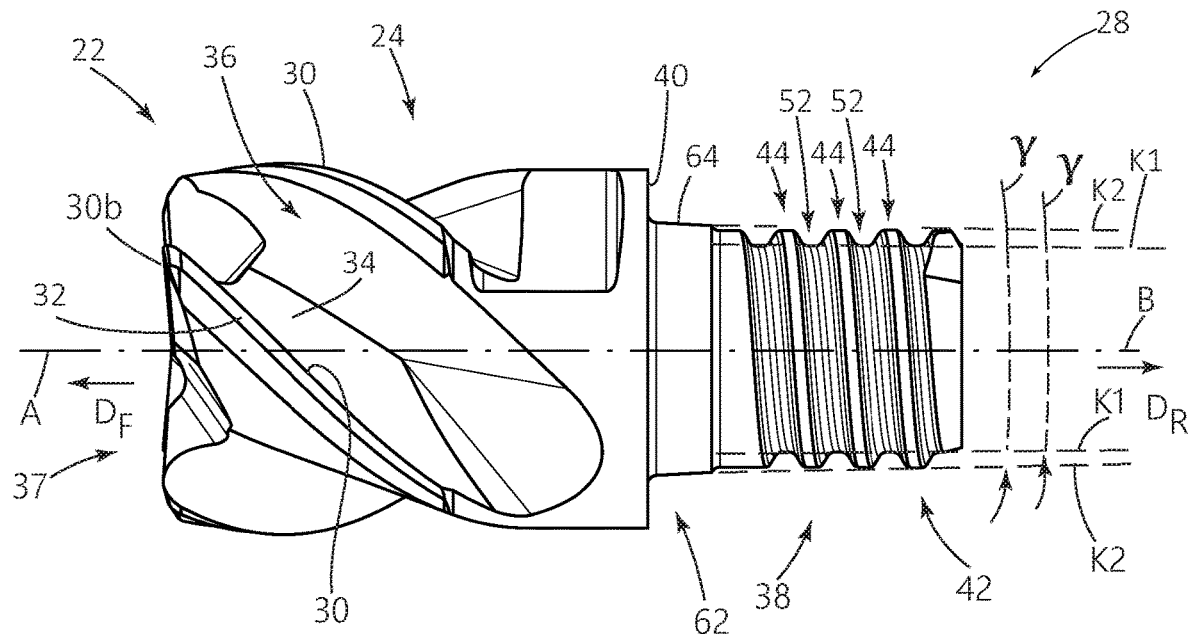
FIG. 3 is a side view of a replaceable cutting head shown in FIGS. 1 and 2.
Figure 4:
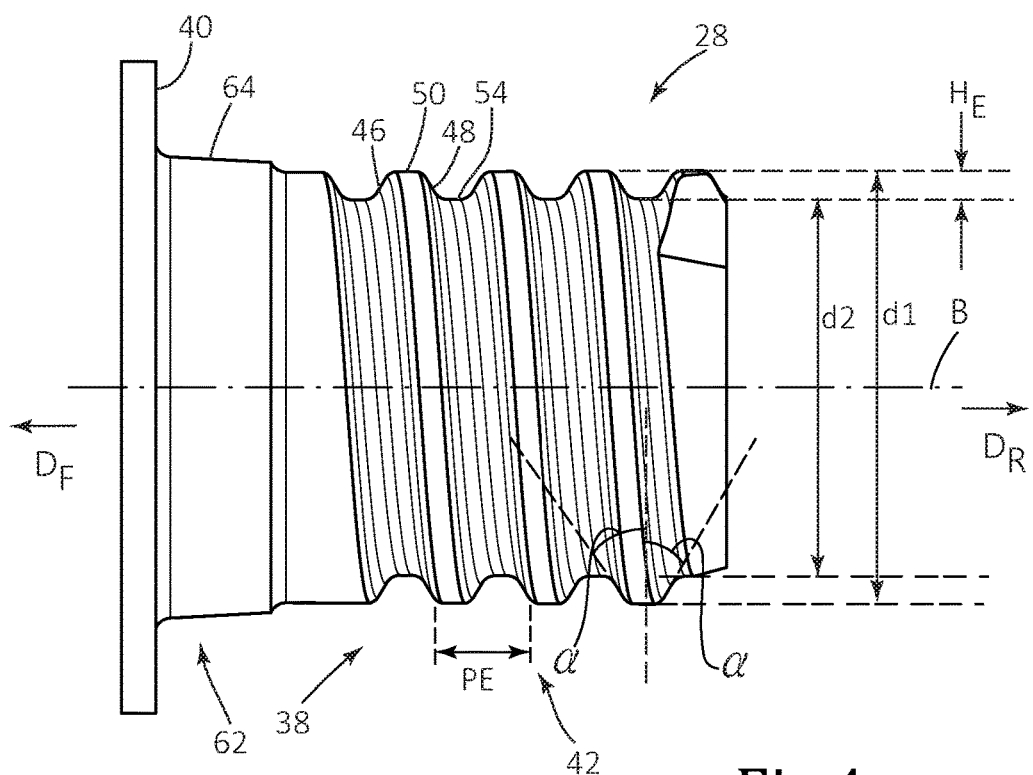
FIG. 4 is a detail of FIG. 3.

Reference is now made to FIGS. 3 and 4. The replaceable cutting head 22 has a forward portion that forms a cutting portion 26 and a rearward portion that forms a mounting portion 28. In accordance with some embodiments of the subject matter of the present application the replaceable cutting head 22 can be formed to have unitary integral one-piece construction. This provides an advantage in that the replaceable cutting head 22 has no detachable cutting inserts (not shown).

Referring to FIG. 3, the cutting portion 26 includes at least one peripheral cutting edge 30. In this non-limiting example shown in the drawings there can be exactly four peripheral cutting edges. Each peripheral cutting edge 30 is formed at the intersection of a peripheral relief surface 32, and a peripheral rake surface 34. The peripheral relief surface 32 is located rotationally behind the peripheral cutting edge 30 and the peripheral rake surface 34 is located rotationally ahead of the peripheral cutting edge 30, both in respect to the direction of rotation R. The orientation of the peripheral cutting edge 30 allows metal cutting operations to be performed.

In accordance with some embodiments of the subject matter of the present application, the cutting portion 26 can include at least one flute 36 for evacuating chips (not shown) that are produced during the cutting operation. One flute 36 is associated with each peripheral cutting edge 30. The replaceable cutting head 22 can include one or more end cutting edges 30b at an end face 37 of the cutting portion 26. In this non-limiting example shown in the drawings, the replaceable cutting head 22 can include exactly four end cutting edges 30b.

Making reference now to FIGS. 3 and 4, the mounting portion 28 includes a male coupling member 38 that protrudes rearwardly from a head base surface 40. The head base surface 40 extends transversely with respect to the head longitudinal axis A and defines a boundary between the cutting portion 26 and the mounting portion 28. That is to say, the cutting portion 26 is formed forward of the head base surface 40 and the mounting portion 28 is formed rearward of the head base surface 40. In accordance with some embodiments of the subject matter of the present application the male coupling member 38 can be rigid. The head base surface 40 can be perpendicular to the head longitudinal axis A. The head base surface 40 is intended to abut a corresponding surface 70 (described further below) on the tool holder 24 when the rotary cutting tool 20 is in a locked position, as will be described hereinafter.

The male coupling member 38 includes an external thread 42. Referring to FIG. 3, the external thread 42 includes an external thread ridge 44 that extends helically about an external thread axis B. The external thread axis B is co-incident with the head longitudinal axis A. Thus, the external thread portion 42 and the replaceable cutting head 22 are co-axial. Referring to FIG. 4, the external thread ridge 44 includes forward and rearward external flank surfaces 46, 48 and an external top surface 50 that extends therebetween. The forward and rearward external flank surfaces 46, 48 face in opposite axial directions $D_F$, $D_R$, with the forward external flank surface 46 facing in the forward direction $D_F$ and the rearward external flank surface 48 facing in the rearward direction $D_R$. The forward and rearward external flank surfaces 46, 48 delimit an external thread groove 52. The external thread groove 52 extends helically about the external thread axis B and includes an external bottom surface 54. The external thread 42 has an external thread pitch PE. In accordance with some embodiments of the subject matter of the present application, the external thread pitch PE can be constant.

Figure 7:
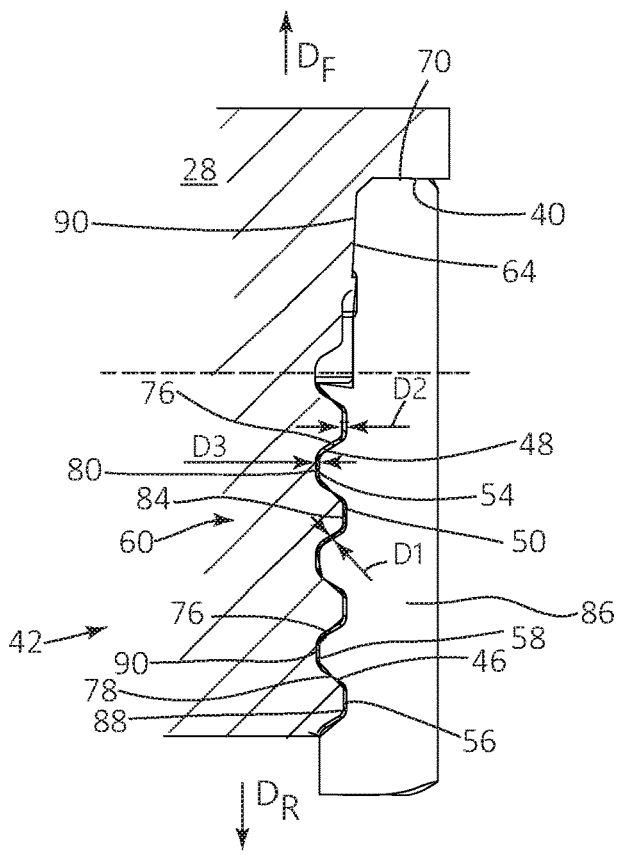
FIG. 7 is a detail of the longitudinal cross-sectional view of the rotary cutting tool shown in FIG. 1, when the rotary cutting tool is in a locked position.

As shown in FIG. 7, in a cross-sectional view taken in an axial plane (that is, a plane that contains the external thread axis B) the external top surface 50 forms a plurality of external thread crests 56 and the external bottom surface 54 forms a plurality of external thread roots 58.

In the same cross-sectional view, the forward and rearward external flank surfaces 46, 48 can be inclined at an external flank angle α with respect to a radial plane perpendicular to the external thread axis B. Preferably, the external flank angle α can be between 28°-34°, and more preferably is 31°. The external thread 42 defines an external thread form 60 that can be trapezoidal. In the present application, "trapezoidal" refers to a four-sided geometric shape in which two of the four side are parallel to one another, while "trapezium" refers to a four-sided geometric shape in which no two sides are parallel to one another. The external top surface 50 and external bottom surface 54 can smoothly transition into the forward and rearward external flank surfaces 46, 48, respectively, defining a radius. Alternatively, the external thread form 60 can be triangular, with the external top and bottom surfaces 50, 54 forming edges.

The external thread 42 is a back-tapered conical thread. It should be appreciated that the term "back-tapered conical thread" throughout the description and claims relates to a thread where at least one of the thread ridge and the thread groove extend about a respective cone, whose surface tapers radially outwardly towards the thread axis in the rearward direction, and thus at least one of the thread crests and thread roots increase in distance from the thread axis in the rearward direction. Thus, in a back-tapered conical thread, at least one thread diameter (either the thread diameter $d_1$ of external thread ridge 44, or the thread diameter $d_2$ of the external thread groove 52, or both) increases in the rearward direction $D_F$ of the cutting head 22. Such a back-tapered conical thread may be formed by threading the hollow forward end of a cylindrical steel rod with an external turning insert. As the steel rod rotates and moves in the axial direction to form the external thread it also moves radially away from the 'static' cutting insert so that the thread has a conical configuration. The cone and the thread are co-axial. In this non-limiting example shown in FIG. 8, both the external thread ridge and the external thread groove extend about a respective cone. Specifically, the thread groove extends about an inner cone K1 defined by the points where the external bottom surface 54 transitions into the forward external flank surface 46. The external thread ridge extends about an outer cone K2 defined by the points where the external top surface 50 transitions into the forward external flank surface 46. Similarly, it should be appreciated that the term "forward-tapered conical thread" throughout the description and claims relates to a thread where the external thread ridge extends about a cone, whose surface tapers radially inwardly towards the thread axis in the rearward direction, and thus the thread crests decrease in distance from the thread axis in the rearward direction.

Each turn of the external thread form 60 is offset from the external thread axis B by a radial distance that, by virtue of the external thread 42 being aback-tapered conical thread, increases as the external thread 42 extends helically about the thread axis in the rearward direction $D_R$. Thus, the forward external flank surface 46 spirals radially outwardly in the rearward direction $D_R$.

At least one of the external thread ridge 44 and the external thread groove 52 can extend about a respective cone K1, K2 having a cone angle γ. The cone angle γ can be in the range of 0.02°≤γ≤1.0°. Advantageously, the cone angle γ can be equal to exactly 0.4°. Both the external thread ridge 44 and the external thread groove 52 can extend about a respective cone K1, K2. The cone angle γ can be the same for the inner cone K1 and the outer cone K2. It should further be appreciated that use of the term "cone angle" throughout the description refers to an angle formed by the tapered surfaces of a cone, in a longitudinal cross-section. It is noted that the term "longitudinal cross-section" refers to a cross-section taken in a plane containing the longitudinal axis. Such a longitudinal cross-section results in an axial plane containing the longitudinal axis.

The plurality of external thread crests 56 define the major diameter and the plurality of external thread roots 58 define the minor diameter of the external thread 42, respectively. The major diameter minus the minor diameter, divided by two, equals the external thread height HE of the external thread 42. The external thread height HE can be constant, or increasing or decreasing in the rearward direction $D_R$ depending on which of the external thread ridge 44 and external thread groove 52 extend about a respective cone. In this non-limiting example shown in the drawings, the external thread height HE is constant in the rearward direction. In accordance with some embodiments of the subject matter of the present application, the external thread 42 can have approximately between three and four turns in the axial direction.

In accordance with some embodiments of the subject matter of the present application, the plurality of external thread crests 56 can be sloped with respect to the external thread axis B and co-linear with each other. Thus, the external top surface 50 can lie on the outer cone K2. The plurality of external thread roots 58 can be sloped with respect to the external thread axis B and co-linear with each other. Thus, the external bottom surface 54 can lie on the inner cone K1.

As shown in FIGS. 3 and 4, the male coupling member 38 includes a forward bearing portion 62. The forward bearing portion 50 is located on the forward side of the external thread 42. The forward bearing portion 62 includes a forward head abutment surface 64 that tapers radially inwardly towards the head longitudinal axis A in a rearward direction $D_R$. That is to say, the forward head abutment surface 64 has a conical shape facing radially outwards. It is noted that the forward head abutment surface 64 is intended to abut a corresponding surface 94 (described further below) on the tool holder 24 when the rotary cutting tool 20 is in a locked position, as will be described hereinafter.

Figure 6:
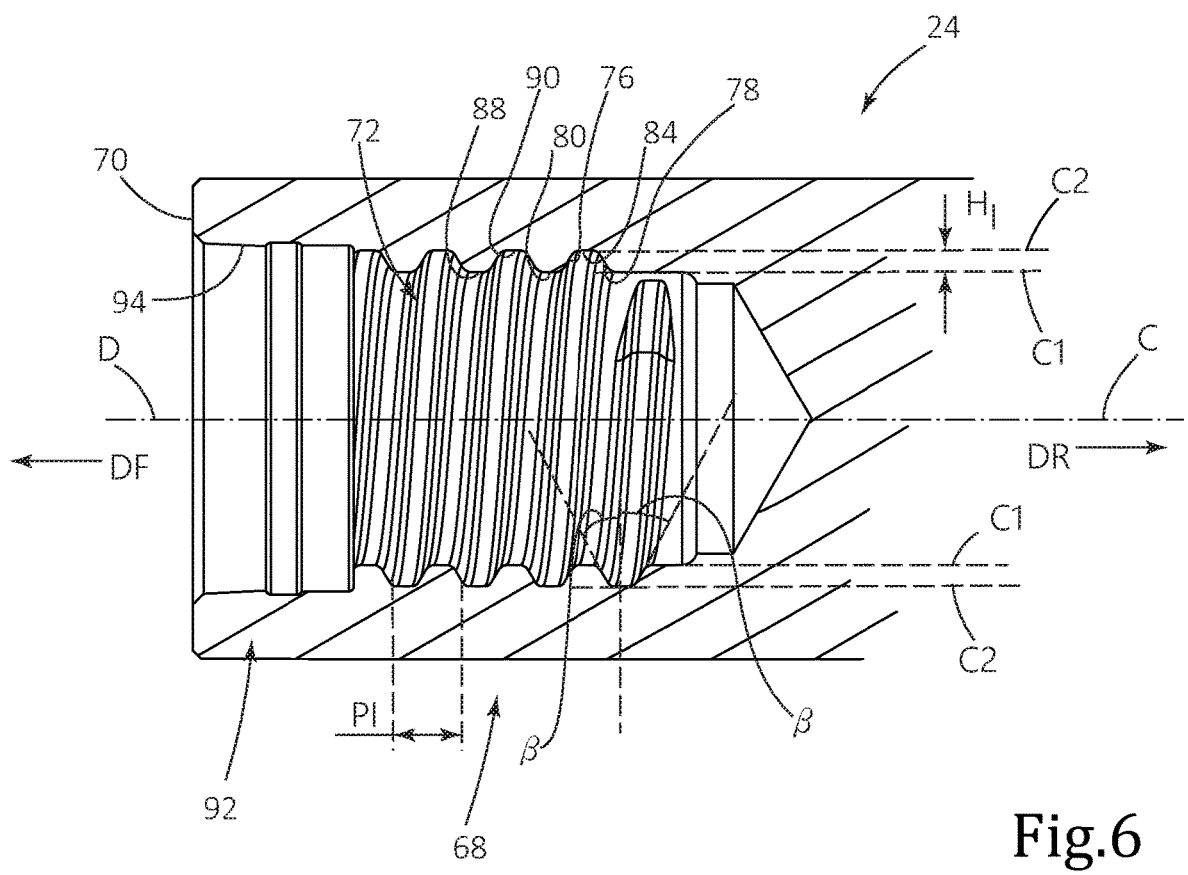
FIG. 6 is a longitudinal cross-sectional view of a female coupling member shown in FIG. 5.

It should be appreciated that use of the terms "radially inward/inwardly" and "radially outward/outwardly" throughout the description and claims refer to a relative position in a perpendicular direction in relation to the head longitudinal axis A and/or holder longitudinal axis C, towards and away from the respective axis, in FIGS. 3 to 4 and FIG. 6.

Figure 5:
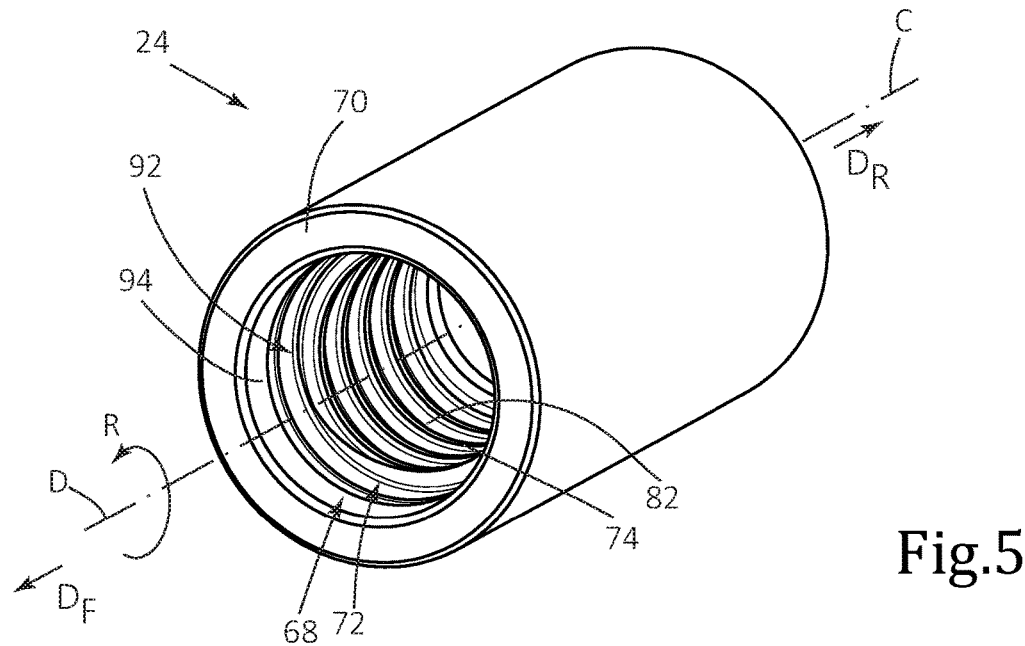
FIG. 5 is a perspective view of a tool holder shown in FIGS. 1 and 2.

Referring now to FIGS. 5 and 6, the tool holder 24 has a holder longitudinal axis C that extends in the forward $D_F$ to rearward direction $D_R$. The tool holder 24 includes a female coupling member 68 that extends rearwardly from a holder forward surface 70. The holder forward surface 70 extends transversely with respect to the holder longitudinal axis C. In accordance with some embodiments of the subject matter of the present application the holder forward surface 70 can be perpendicular to the holder longitudinal axis C.

The female coupling member 68 includes an internal thread 72. As shown in a longitudinal cross-sectional view of the female coupling member 68 containing the internal thread axis D (i.e. FIG. 6), the internal thread 72 includes an internal thread ridge 74 that extends helically about an internal thread axis D. The internal thread axis D is co-incident with the holder longitudinal axis C. Thus, the internal thread 72 is co-axial with the tool holder 24. The internal thread ridge 74 includes forward and rearward internal flank surfaces 76, 78 and an internal top surface 80 that extends therebetween. The forward and rearward internal flank surfaces 76, 78 face in opposite axial directions $D_F$, $D_R$, with the forward internal flank surface 76 facing in the forward direction $D_F$ and the rearward internal flank surface 78 facing in the rearward direction $D_R$. The forward and rearward internal flank surfaces 76, 78 delimit an internal thread groove 82. The internal thread 72 has an internal thread pitch PI. In accordance with some embodiments of the subject matter of the present application, the internal thread pitch PI can be constant. The internal thread pitch PI can be same as the external thread pitch PE.

The internal thread groove 82 extends helically about the internal thread axis D and includes an internal bottom surface 84. In a cross-sectional view taken in an axial plane (that is, a plane that contains the internal thread axis D) the internal top surface 80 forms a plurality of internal thread crests 88 and the internal bottom surface 84 forms a plurality of internal thread roots 90. In accordance with some embodiments of the subject matter of the present application, the plurality of internal thread crests 88 can be parallel to the internal thread axis D and co-linear with each other. The plurality of internal thread roots 90 can be parallel to the internal thread axis D and co-linear with each other.

Figure 8:
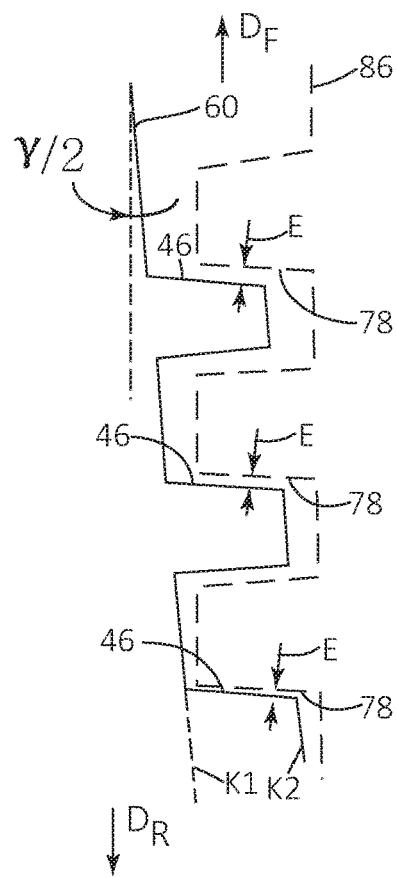
FIG. 8 is a schematic view of the external thread form of a back-tapered conical external thread with the internal thread form of an internal thread form of a straight internal thread superimposed thereupon, when the rotary cutting tool is in a released position.

In a cross-sectional view taken in an axial plane containing the internal thread axis D (i.e. FIG. 6), the forward and rearward internal flank surfaces 76, 78 can be inclined at an internal flank angle β with respect to a radial plane perpendicular to the internal thread axis D. Preferably, the internal flank angle β can be 31°. The internal thread 72 defines an internal thread form 86 that can be trapezoidal. Referring now to FIG. 8, the sides of the trapezium may not be equal in length. The internal top surface 80 and internal bottom surface 84 can smoothly transition into the forward and rearward internal flank surfaces 76, 78, respectively, defining a radius. Alternatively, the internal thread form 86 can be triangular with the internal top and bottom surfaces 80, 84 forming edges.

In accordance with some embodiments of the subject matter of the present application, the internal thread 72 can be a straight thread. It should be appreciated that the term "straight thread" throughout the description and claims relates to a thread where the thread ridge and thread groove extends about a respective cylinder and thus all the thread crests 88 are equidistant from the thread axis, as are all the thread roots 90. Specifically, the internal thread ridge 74 extends about an inner cylinder C1 defined by the points where the internal top surface 80 transitions into the forward and rearward internal flank surfaces 78. The internal top surface 80 can lie on the inner cylinder C1. The internal thread groove 82 extends about an outer cylinder C2 defined by the points where the internal bottom surface 84 transitions into the rearward internal flank surface 78. The internal bottom surface 84 can lie on the outer cylinder C2.

The plurality of internal thread crests 88 define the minor diameter and the plurality of internal thread roots 90 define the major diameter of the internal thread 72, respectively. The major diameter minus the minor diameter, divided by two, equals the internal thread height $H_1$ of the internal thread 72. The internal thread height $H_1$ can be constant. In accordance with some embodiments of the subject matter of the present application, the internal thread 72 can have approximately between three and four turns in the axial direction.

As shown in FIGS. 5 and 6, the female coupling member 68 includes a forward supporting portion 92 The forward supporting portion 92 is located on the forward side of the internal thread 72. The forward supporting portion 92 includes a forward holder abutment surface 94 that tapers radially inwardly towards the holder longitudinal axis C in a rearward direction $D_R$. That is to say, the forward holder abutment surface 94 has a conical shape facing radially inwards. The forward holder abutment surface 94 is configured and dimensioned to be complementary to the forward head abutment surface 64 discussed above.

Assembly of the rotary cutting tool 20 is known, for example, from U.S. Pat. No. 6,485,220 B2, which is hereby incorporated by reference in its entirety. It is noted that the rotary cutting tool 20 is adjustable between a released position and a locked (or assembled) position.

Attention is now drawn to FIG. 8 showing a schematic view of the external thread form 60 of the back-tapered conical external thread 42. By means of dashed lines the internal thread form 86 of a straight internal thread, which are threadingly dis-engaged with each other, are superimposed thereupon (i.e. the rotary tool is in the released position). It is noted that the cone angle γ of the external thread 42 that forms the external thread form 60 is exaggerated in order to clearly show the thread forms 60, 98 in relation to each other, and thus distances do not represent of true values. In accordance with some embodiments of the subject matter of the present application, the forward external flank surface 46 is distanced from the respective rearward internal flank surface 78 by a flank distance E. Moreover, the flank distance E decreases in magnitude in the rearward direction $D_R$. That is to say, the flank distance E decreases in magnitude for successive thread turns in the rearward direction $D_R$.

To adjust the rotary cutting tool 20 to the locked position the external thread 42 is screwed (i.e. turned) into the internal thread 72. By virtue of the decreasing flank distance E, the forward extern& flank surface 46 initially abuts the rearward internal flank surface 78 at the rearmost thread turn. By subsequent screwing of the external thread 42 into the internal thread 72, the forward external surface 46 progressively abuts the rearward internal flank surface 78 at each sequential thread turn in the forward direction $D_F$, until the threaded coupling is fully tightened and the rotary cutting tool 20 is in the locked position.

In the locked position the male coupling member 38 is removably retained in the female coupling member 68. Also, the external and internal threads 42, 72 threadingly engage each other. Referring now to FIG. 7, the forward head abutment surface 64 abuts the forward holder abutment surface 94. In accordance with some embodiments of the subject matter of the present application, the rearwardly facing head base surface 40 can abut the forwardly facing holder forward surface 70. The rearward internal flank surface 78 can abut the forward external flank surface 46. The forward internal flank surface 76 can be spaced apart from the rearward external flank surface 48 by a rearward flank distance D1. The internal top surface 80 can be spaced apart from the external bottom surface 54 by an upper distance D2. The internal bottom surface 84 can be spaced apart from the external top surface 50 by a lower distance D3. The rearward flank distance D1, the upper distance D2 and the lower distance D3 can all decrease in magnitude in the rearward direction $D_R$.

By virtue of the decreasing flank distance E configuration provided (as described above), when assembled (i.e., threadingly engaged), the frictional engagement between the external thread 42 and the internal thread 72 (i.e. between the rearward internal flank surface 78 and the forward external flank surface 46) increases in a direction from the forwardmost turn of the external thread 42 towards the rearmost turn. In particular, the configuration having the cone angle γ in the range of $0.02°≤γ≤1.0°$ ensures the external thread 42 is threadingly engaged with the internal thread 72 along its entire axial extent, with sufficient frictional engagement at the forward end of the coupling for a secure attachment.

Again by virtue of the decreasing flank distance E configuration, advantageously, the contact forces, when the rotary cutting tools 20 are assembled and working, are more highly concentrated further in the rearward direction $D_R$ compared with a regular threads (e.g. straight external thread threadingly engaged with a straight internal thread). By virtue of such threaded engagement the rotary cutting tool 20 has improved stability against lateral cutting forces.

Although the subject matter of the present application has been described to a certain degree of particularity, it should be understood that various alterations and modifications could be made without departing from the spirit or scope of the invention as hereinafter claimed.

What is claimed is:

1. A replaceable cutting head (22), having a head longitudinal axis (A) extending in a forward ($D_F$) to rearward direction ($D_R$), comprising
    a forward portion forming a cutting portion (26); and
    a rearward portion forming a mounting portion (28), the mounting portion (28) comprising a male coupling member (38) having an external thread (42) and protruding rearwardly from a head base surface (40), the head base surface (40) extending transversely with respect to the head longitudinal axis (A), and defining a boundary between the cutting portion (26) and the mounting portion (28), wherein:
        the external thread (42) comprises an external thread ridge (44) extending helically about an external thread axis (B) and comprising forward and rearward external flank surfaces (46, 48) and an external top surface (50) extending therebetween;
        the forward and rearward external flank surfaces (46, 48) generally face in opposite axial directions ($D_F$, $D_R$) and delimit a helical external thread groove (52) that comprises an external bottom surface (54);
        the external thread (42) of the male coupling member (38) is a back-tapered conical thread having at least one thread diameter ($d_1$, $d_2$) which increases in the rearward direction ($D_R$);
        at least one of the external thread ridge (44) and the external thread groove (52) extends about a respective cone (K1, K2) having a cone angle (γ); and
        the cone angle (γ) is in the range of $0.4°≤γ≤1.0°$.

2. The replaceable cutting head (22) according to claim 1, wherein both the external thread ridge (44) and the external thread groove (52) extend about a respective cone (K1, K2), an outer cone (K2) and an inner cone (K1), respectively.

3. The replaceable cutting head (22) according to claim 2, wherein the cone angle (γ) is the same for the inner cone (K1) and the outer cone (K2).

4. The replaceable cutting head (22) according to claim 1, wherein in a cross-sectional view taken in an axial plane containing the external thread axis (B):
    the external top surface (50) forms a plurality of external thread crests (56) that are sloped with respect to the external thread axis (B) and co-linear with each other; and
    the external bottom surface (54) forms a plurality of external thread roots (58) that are sloped with respect to the external thread axis (B) and co-linear with each other.

5. The replaceable cutting head (22) according to claim 1, wherein in a cross-sectional view taken in an axial plane containing the head longitudinal axis (A), the external thread (42) defines an external thread form (60) that is trapezoidal.

6. The replaceable cutting head (22) according to claim 1, wherein the external thread (42) has a constant external thread pitch (PE).

7. A rotary cutting tool (20) having a longitudinal axis (L) and extending in a forward ($D_F$) to rearward direction ($D_R$), comprising:
    a tool holder (24) having a holder longitudinal axis (C) and comprising a female coupling member (68) having an internal thread (72) extending rearwardly from a holder forward surface (70), the holder forward surface (70) extending transversely with respect to the holder longitudinal axis (C); and
    a replaceable cutting head (22) threadingly engaged to the tool holder (24), the replaceable cutting head (22) having a head longitudinal axis (A) extending in a forward ($D_F$) to rearward direction ($D_R$), and comprising
        a forward portion forming a cutting portion (26); and
        a rearward portion forming a mounting portion (28), the mounting portion (28) comprising a male coupling member (38) having an external thread (42) and protruding rearwardly from a head base surface (40), the head base surface (40) extending transversely with respect to the head longitudinal axis (A), and defining a boundary between the cutting portion (26) and the mounting portion (28), wherein:
            the external thread (42) comprises an external thread ridge (44) extending helically about an external thread axis (B) and comprising forward and rearward external flank surfaces (46, 48) and an external top surface (50) extending therebetween;
            the forward and rearward external flank surfaces (46, 48) generally face in opposite axial directions ($D_F$, $D_R$) and delimit a helical external thread groove (52) that comprises an external bottom surface (54); and
            the external thread (42) of the male coupling member (38) is a back-tapered conical thread having at least one thread diameter ($d_1$, $d_2$) which increases in the rearward direction ($D_R$);
    wherein:
        the rotary cutting tool (20) is adjustable between:

a released position in which the internal and external threads (42, 72) are not threadingly engaged to one another, and a locked position in which the male coupling member (38) is removably retained in the female coupling member (68) with the internal and external threads (42, 72) threadingly engaged to one another; and the frictional engagement between the external thread (42) and the internal thread (72) increases in a direction from a forwardmost turn of the external thread (42) towards the rearmost turn of the external thread (42).

8. The rotary cutting tool (20) according to claim 7, wherein the internal thread (72) of the female coupling member (68) is a straight thread.

9. The rotary cutting tool (20) according to claim 7, wherein:

the internal thread (72) comprises an internal thread ridge (74), extending helically about an internal thread axis (D), and comprising forward and rearward internal flank surfaces (76, 78) and an internal top surface (80) extending therebetween;

the forward and rearward internal flank surfaces (76, 78) generally face in opposite axial directions ($D_F$, $D_R$) and delimit a helical internal thread groove (82) that comprises an internal bottom surface (84); and the forward external flank surface (46) and the forward internal flank surface (76) face in the forward direction ($D_F$);

the rearward external flank surface (48) and the rearward internal flank surface (78) face in the rearward direction ($D_R$); and in the locked position, the rearward internal flank surface (78) abuts the forward external flank surface (46).

10. The rotary cutting tool (20) according to claim 9, wherein in the locked position:

the forward internal flank surface (76) is spaced apart from the rearward external flank surface (48) by a rearward flank distance (D1);

the internal top surface (80) is spaced apart from the external bottom surface (54) by an upper distance (D2); and the internal bottom surface (84) is spaced apart from the external top surface (50) by a lower distance (D3).

11. The rotary cutting tool (20) according to claim 7, wherein the internal thread (72) has a constant internal thread pitch (PI) which is the same as a constant external thread pitch (PE) of the external thread (42).

12. The rotary cutting tool (20) according to claim 7, wherein:

at least one of the external thread ridge (44) and the external thread groove (52) extends about a respective cone (K1, K2) having a cone angle (γ); and the cone angle (γ) is in the range of 0.02°≤γ≤1.0°.

13. The rotary cutting tool (20) according to claim 7, wherein:

at least one of the external thread ridge (44) and the external thread groove (52) extends about a respective cone (K1, K2) having a cone angle (γ); and the cone angle (γ) is in the range of 0.4°≤γ≤1.0°.

14. A rotary cutting tool (20) having a longitudinal axis (L) and extending in a forward ($D_F$) to rearward direction ($D_R$), comprising:

a replaceable cutting head (22) having a head longitudinal axis (A) extending in said forward ($D_F$) to rearward direction ($D_R$), and comprising:

a forward portion forming a cutting portion (26); and a rearward portion forming a mounting portion (28), the mounting portion (28) comprising a male coupling member (38) having an external thread (42) and protruding rearwardly from a head base surface (40), the head base surface (40) extending transversely with respect to the head longitudinal axis (A), and defining a boundary between the cutting portion (26) and the mounting portion (28), wherein:

the external thread (42) comprises an external thread ridge (44) extending helically about an external thread axis (B) and comprising forward and rearward external flank surfaces (46, 48) and an external top surface (50) extending therebetween;

the forward and rearward external flank surfaces (46, 48) generally face in opposite axial directions ($D_F$, $D_R$) and delimit a helical external thread groove (52) that comprises an external bottom surface (54); and the external thread (42) of the male coupling member (38) is a back-tapered conical thread having at least one thread diameter ($d_1$, $d_2$) which increases in the rearward direction ($D_R$); and a tool holder (24) having a holder longitudinal axis (C) and comprising:

a female coupling member (68) having an internal thread (72) extending rearwardly from a holder forward surface (70), the holder forward surface (70) extending transversely with respect to the holder longitudinal axis (C); wherein:

the internal thread (72) comprises an internal thread ridge (74), extending helically about an internal thread axis (D), and comprising forward and rearward internal flank surfaces (76, 78) and an internal top surface (80) extending therebetween; and the forward and rearward internal flank surfaces (76, 78) generally face in opposite axial directions ($D_F$, $D_R$) and delimit a helical internal thread groove (82) that comprises an internal bottom surface (84); and wherein:

the rotary cutting tool (20) is adjustable between:

a released position in which the internal and external threads (42, 72) are not threadingly engaged to one another, and a locked position in which the male coupling member (38) is removably retained in the female coupling member (68) with the internal and external threads (42, 72) threadingly engaged to one another; and in the locked position:

the forward internal flank surface (76) is spaced apart from the rearward external flank surface (48) by a rearward flank distance (D1);

the internal top surface (80) is spaced apart from the external bottom surface (54) by an upper distance (D2);

the internal bottom surface (84) is spaced apart from the external top surface (50) by a lower distance (D3); and the rearward flank, upper and lower distances (D1, D2, D3) all decrease in the rearward direction ($D_R$).

* * * * *